United States Patent Office 3,409,671
Patented Nov. 5, 1968

3,409,671
3'-PHENYL-3'-CYCLOHEXENYL-PROPYL AMINES AND SALTS THEREOF
Gustav Ehrhart, Bad Soden, Taunus, Ernst Lindner, Frankfurt am Main, and Heinrich Ott, Eppstein, Taunus, Germany, assignors to Farbwerke Hoechst Aktiengesellschaft vormals Meister Lucius & Bruning, Frankfurt am Main, Germany, a corporation of Germany
No Drawing. Filed May 13, 1966, Ser. No. 549,817
Claims priority, application Germany, June 2, 1965, F 46,214
4 Claims. (Cl. 260—570.5)

ABSTRACT OF THE DISCLOSURE

Phenyl-cyclohexenyl-propylamines of the formula

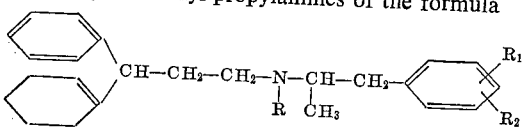

wherein R is hydrogen or methyl and $R_1$ and $R_2$ are hydrogen or alkyl of up to four carbon atoms, as well as the acid addition salts thereof are useful as coronary dilators.

---

We have found that 1-phenyl-3-aminopropane derivatives of the general Formula I

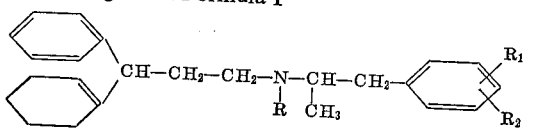

wherein R represents hydrogen or a methyl group, $R_1$ and $R_2$ represent hydrogen or alkyl groups having at most 4 carbon atoms, and the salts thereof can be obtained by
(a) reacting 1-phenyl - 1 - cyclohexen-(1)-yl-3-aminopropane of the Formula II

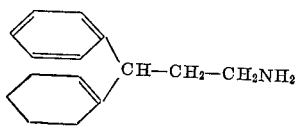

with ketones of the general Formula III

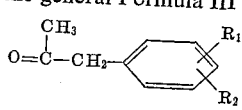

wherein $R_1$ and $R_2$ have the meanings given above, and simultaneously or subsequently reducing the C=N double linkage in the condensation product obtained, or
(b) reacting 1 - phenyl - cyclohexen(1) - yl-3-amino-propane of the Formula IV

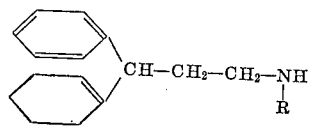

wherein R has the meaning given above, with 1-phenyl-2-halogeno-propanes of the general Formula V

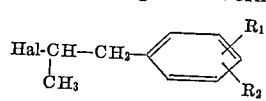

wherein $R_1$ and $R_2$ have the meanings given above, if desired in the presence of agents binding hydrohalic acid, or (c) reacting 1 - phenyl - 1 - cyclohexen(1)-yl-3-halogenopropane of the Formula VI

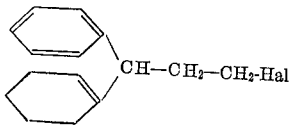

with 1-phenyl-2-aminopropanes of the general Formula VII

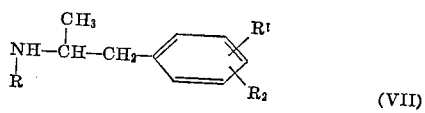

wherein R, $R_1$ and $R_2$ are defined as above, if desired in the presence of agents binding hydrohalic acid, or
(d) reacting 1 - phenyl - 1-cyclohexen-(1)-yl-propion-aldehyde of the Formula VIII

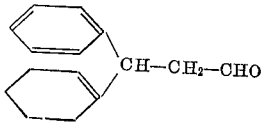

with 1-phenyl-2-aminopropanes of the general Formula VII, wherein R stands for a hydrogen atom, and simultaneously or subsequently reducing the C=N double linkage in the condensation products obtained, or
(e) reacting phenyl-cyclohexylidene-acetonitrile of the Formula IX

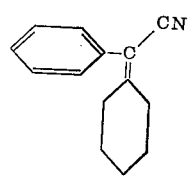

with 1 - phenyl - N - halogenoethyl-propylamines of the general Formula X

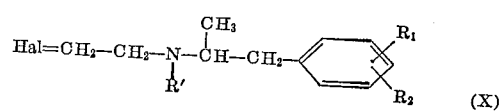

wherein R' represents a methyl group, Hal stands for a halogen atom, and $R_1$ and $R_2$ have the meanings given above, in the presence of an agent binding hydrohalic acid, and replacing the nitrile group in the compounds otbained by a hydrogen atom either by heating said compounds with sodium amide in an inert organic solvent or by hydrolyzing them with a strong acid and heating the carboxyl compound obtained, or
(f) reducing carboxylic acid amides of the general Formula XI

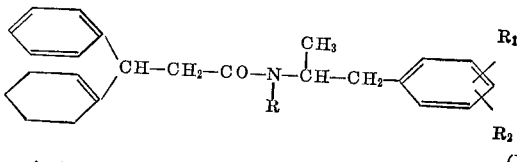

wherein R, $R_1$ and $R_2$ are defined as above, by means of complex metal hydrides,
and, if desired, methylating the compounds obtained at the nitrogen atom by reaction with methylating agents and/or converting the basic compounds obtained into their acid addition salts by reaction with inorganic or organic acids.

The reaction of 1-phenyl-1-cyclohexen(1)-yl-3-amino-propane of Formula II with ketones of the general Formula III is advantageously carried out by first preparing the condensation product of the amine and the ketone, if desired at slightly elevated temperatures and in the presence of an inert organic solvent such as benzene or toluene, and after dilution with a suitable solvent, for example a lower alcohol, if desired in the presence of water, reducing the product by addition of sodium boron hydride. The reduction of the C=N double linkage may likewise be carried out by means of nascent hydrogen, for example with aluminium amalgam and alcohol or with sodium amalgam.

As starting substances of the general Formula III suitable for use in the process described sub (a) there may be mentioned, for example: phenylacetone, 2-(3-, 4-)-methylphenylacetone, 3,4-dimethylphenyl-acetone, 2-(3-, 4-)-ethylphenyl-acetone, 3,4-diethylphenyl-acetone, 2,5-diethylphenyl-acetone, or the corresponding propyl- or butyl-phenyl-acetone derivatives. According to another method of operation of the process described under (b) and (c) respectively, 1-phenyl-cyclohexen(1)-yl-3-amino-propane of Formula IV or the corresponding 3-halogen compound of Formula VI can be reacted with 1-phenyl-2-halogenopropanes of the general Formula V or the corresponding 2-amino compounds of the general Formula VII. As compounds of the general Formula V there may be used, for example, 1-phenyl-2-chloro-propane, 1-phenyl-2-bromo-propane, 1-phenyl-2-iodo-propane, 1-(2'-, (3'-, (4'-methyl-phenyl)-2-chloro- or -bromo-propane as well as the phenyl propanes which are substituted in the nucleus by alkyl according to the meanings of $R_1$ and $R_2$. Suitable amino compounds are primary as well as secondary amines, for example compounds of the general Formula VII, such as 1-phenyl-2-amino-propane and 1-phenyl-2-methylamino-propane, as well as the phenylaminopropanes which are substituted by alkyl according to the meanings of $R_1$ and $R_2$. The reaction can be carried out by prolonged heating, if desired in a suitable solvent such, for example, as ether, chloroform or an aromatic hydrocarbon; it is expedient to use 2 mols of the amine to bind the hydrohalic acid which is set free. The hydrohalic acid may also be bound by the usual agents, for example by alkali metal or alkaline earth metal carbonates or hydroxides, as well as by organic bases such as pyridine or quinoline, which may at the same time serve as solvents.

Another method of operation which is advantageously applied is the condensation described sub (d) of 1-phenyl-1-cyclohexen-(1)-yl-propionaldehyde of Formula VIII with 1-phenyl-2-amino-propanes of the general Formula VII. The aldehyde of Formula VIII is prepared, for example by reaction of phenyl-cyclohexylidene-acetonitrile with chloroacetal, subsequent splitting off of the nitrile group and hydrolysis of the acetal group. The reaction conditions for the condensation of the aldehyde with the aminopropanes of Formula VII correspond to those described sub (a) for the condensation of phenyl-cyclohexenyl-3-amino-propane with ketones of the general Formula III. In this case, too, the method which is preferred is the reduction of the condensation product of aldehyde and phenyl-amino-propane by means of sodium boron hydride.

The products of the invention may also be prepared according to method (e) by reacting phenyl-cyclohexylidene-acetonitrile of Formula IX with 1-phenyl-N-halogenoethyl-propylamines of the general Formula X.

The reaction of said halogenated phenyl-propylamines with phenyl-cyclohexylidene-acetonitrile is preferably carried out in an inert organic solvent such, for example, as benzene, toluene or xylene.

As agents splitting off hydrohalic acid there may be mentioned, for example: sodium amide, phenyl-sodium, phenyl-lithium and metallic sodium. It is advantageous to dissolve or suspend two of the three reaction components required (phenylcyclohexylidene-acetonitrile, agent splitting off hydrohalic acid and halogeno-ethyl-phenyl-propylamine) in an inert solvent and to add the third component portionwise. When the addition is terminated the whole is advantageously refluxed for some time and, after addition of water, the reaction mixture is worked up in the usual manner, for instance by extracting the basic components from the organic solvent by means of dilute acids.

Subsequently, the nitrile group is removed, for instance by prolonged heating with sodium amide in benzene or toluene (cf. for example, Liebigs Annalen, 561, page 52 (1948)). It may also be hydrolized with strong acids, for instance sulfuric acid of 70% strength, and from the carboxyl group thus obtained carbon dioxide is separated by heating.

The products according to the invention can be likewise obtained by reduction of the carboxylic acid amides of the general Formula XI. Said carboxylic acid amides are prepared for example by reacting phenylcyclohexen-(1)-yl-propionic acid chloride with 1-phenyl-2-aminopropane. The reduction of the carboxylic acid amides is advantageously carried out by means of lithium-aluminium hydride in the presence of an inert organic solvent such as ether or tetrahydrofurane. After refluxing for several hours water is cautiously added and the aluminium slime formed is removed by filtration. After separation of the organic layer the product is worked up in the usual manner.

The products of the general Formula I, in which R represents a hydrogen atom, can be converted with the usual methylating agents into the N-methyl compounds. Suitable for this purpose are, for example, formic acid, formaldehyde, dimethylsulfate or methylhalides, such as methyliodide.

In the form of basic compounds the products of the invention can be converted by means of inorganic or organic acids into the corresponding salts. As inorganic acids there may be used: hydrohalic acids such as hydrochloric acid and hydrobromic acid, sulfuric acid, phosphoric acid or amido-sulfonic acid. As organic acids there may be mentioned, for example: acetic acid, propionic acid, lactic acid, maleic acid, succinic acid, tartaric acid, benzoic acid, salicylic acid, citric acid, aceturic acid, hydroxyethane-sulfonic acid and ethylene-diamine-tetracetic acid.

The products of the invention show a very favorable action on cardiac and blood vascular circulation. In Langendorff's test in the isolated heart of the guinea pig an administration of 1-phenyl-2-[3'-phenyl-3'-cyclohexenyl-propyl(1')-methylamino]-propane, for example, increases the coronary perfusion by 96% upon a single injection of $2.5\sigma$, whereas heart frequency and amplitude of contraction are not influenced. In order to obtain the same coronary dilatation with the known compound 1-phenyl-2-[3',3'-diphenyl-propyl-(1')-amino]-propane the dose must be doubled.

Compared with the known compound the above-mentioned product of the invention shows, in addition, a more favorable toxicity. In the test in mice the $LD_{min}$ of the known 1-phenyl-2-[3',3'-diphenylpropyl-(1')-amino]-propane amount to 15 milligrams/kilogram, whereas the $LD_{min}$ of the novel 1-phenyl-2-[3'-phenyl-3'-cyclohexenyl-propyl(1')-methylamino]-propane obtained according to the process of the invention amounts to 25 milligrams/kilogram. Furthermore, the compound mentioned is distinguished by an improved local tolerability.

The compounds are active in their free form as well as in the form of their salts and suitable for oral and parenteral administration. They may therefore be applied per se or in admixture with the usual pharmaceutical carriers, such as water, starch, lactose, or talc, or with the usual pharmaceutical adjuvants, for example stabilizers.

The products obtained according to the process of the invention may be administered in the form of tablets, dragées, capsules, ampoules, solutions, emulsions or suspensions.

The following examples illustrate the invention but they are not intended to limit it thereto.

Example 1.—1-pheny-2-(3'-phenyl-3'-cyclohexenyl-propyl(1')-methyl-amino)-propane hydrochloride

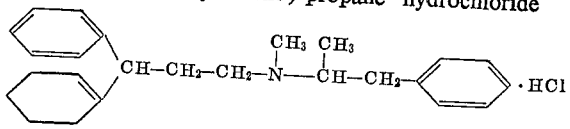

To a solution of 19.7 grams of phenyl-cyclohexylidene-acetonitrile in 100 cc. of benzene 21.2 grams of 2-(N-chloroethyl-N-methyl)-amino-3-phenylpropane are added. Subsequently, 4.5 grams of sodium amide are introduced and the solution is heated on the steam bath for 5 hours. After the organic layer has been washed with water, ether is added and the whole is shaken with dilute hydrochloric acid. There are formed three layers. The oily hydrochloride-salt layer is separated, made alkaline by means of sodium hydroxide solution, extracted with ether and concentrated. In order to split off the nitrile group the 21 grams of oil obtained are dissolved in 100 cc. of benzene and refluxed for 2 hours with 15 grams of sodium amide. After removal of the solvent the residue is subjected to distillation in vacuo. Yield 11.9 grams.

11.0 grams of the oil obtained, boiling at 165–180° C. at a pressure of 0.01 mm. of mercury, are dissolved in a small amount of methanol, 32 cc. of 1 N HCl are added and the whole is concentrated to dryness in vacuo. The residue is dissolved in a small amount of absolute alcohol, ether is added until the whole turns turbid, the separated crystals are filtered with suction and recrystallized from ethylacetate. There are obtained 1.5 grams of 1-phenyl-2-(3'-phenyl-3'-cyclohexenyl-propyl(1')-methylamino)-propane hydrochloride melting at 139–140.5° C.

Example 2.—1-phenyl-2-(3'-phenyl-3'-cyclohexenyl-propyl-(1')-methylamino)-propane hydrochloride

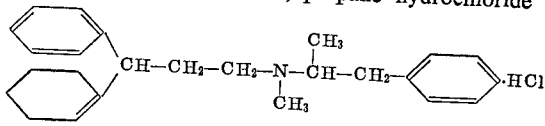

8.4 grams of 3-phenyl-3-cyclohexenyl-propionaldehyde (prepared by reaction of phenylcyclohexylidine-acetonitrile with choroacetal, subsequent splitting off of the nitrile group and hydrolysis of the acetal group to yield the aldehyde) are combined with 5.96 grams of 2-methyl-amino-3-phenyl-propane, whereupon the temperature of the mixture rises to 45° C. A small amount of benzene is added to remove the turbidity, and the benzene is then eliminated by distillation in vacuo. The residue is dissolved in methanol and 1 gram of NaBH$_4$ is introduced. The methanol is distilled off under reduced pressure, and dilute hydrochloric acid and ether are added to the residue. Upon addition of petroleum ether there are formed three layers. The oily hydrochloride-salt layer is separated, shaken with dilute sodium hydroxide solution, and the ether layer is dried over an atmosphere of Na$_2$SO$_4$ and distilled off. The residue is combined with 25.4 cc. of 1 N hydrochloric acid in a small amount of methanol, the whole is concentrated to dryness in vacuo and the residue recrystallized from ethyl-acetate. Yield: 5.9 grams of 1-phenyl-2-(3'-phenyl-3'-cyclohexenyl-propyl(1')-methylamino)-propane hydrochloride, melting at 140° C.

Example 3.—1-phenyl-2-(3'-phenyl-3'-cyclohexenyl-propyl(1')-amino)-propane hydrochloride

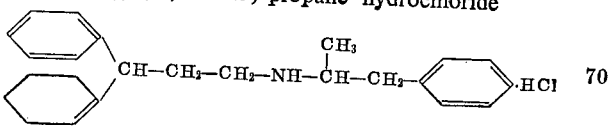

Into a solution of 148 grams of phenylcyclohexylidene-acetonitrile and 133 grams of chloroacetal in 300 cc. of benzene there are introduced 34 grams of sodium amide and the whole is heated to 55° C., whereupon the temperature rises to 80° C. with violent evolution of NH$_3$. The solution is then boiled for one hour, after cooling combined with water, the organic layer is washed with water and distilled. In order to split off the nitrile group the remaining 223 grams of oily 3-phenyl-3-cyclohexenyl-3-cyanopropionaldehyde-diethylacetal are dissolved in 350 cc. of benzene, 130 grams of sodium amide are added and the whole is boiled for 2 hours while being stirred. Subsequently, water is dropwise added, while cooling with ice, stirring and passing through a stream of nitrogen, until all the sodium amide is decomposed. The benzene solution is washed several times with water and the solvent is distilled off. The remaining brown oil is heated for 1 hour, while vigorously stirring, with 1 litre of 2 N H$_2$SO$_4$. Cooling is followed by extraction with ether; the residue is distilled in vacuo. There are obtained 59.5 grams of oily 3-phenyl-3-cyclohexenyl-propionaldehyde, boiling at 92–94° C. at a pressure of 0.01 mm. of mercury.

8.6 grams of 3-phenyl-3-cyclohexenyl-propionaldehyde are combined with 5.4 grams of 2-amino-3-phenyl-propane, whereupon the temperature of the mixture rises to about 45° C. A small amount of benzene is then added and the whole is subjected to distillation in vacuo. The residue is dissolved in methanol, 1 gram of NaBH$_4$ is introduced which causes the temperature to rise to 55° C. After 15 minutes the whole is acidified with dilute hydrochloric acid and the methanol is distilled off under reduced pressure. The residue is combined with ether, the separated crystals are filtered with suction, washed with water and ether and dried on the steam bath. Yield: 12.6 grams of 1-phenyl-2-(3'-phenyl - 3' - cyclohexenyl-propyl-(1')-amino) - propane hydrochloride, melting at 171–172° C.

Example 4.—1-(3',4'-dimethylphenyl)-2 - [3" - phenyl-3"-cyclohexenyl - propyl(1") - amino]-propane hydrochloride

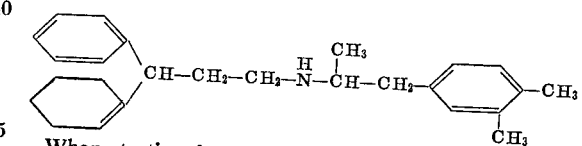

When starting from 8.6 grams of phenyl-cyclohexenyl-propionaldehyde and 6.5 grams of 2-amino-3(3',4'-dimethylphenyl)-propane and proceeding in analogous manner to that described in Example 3, there are obtained 4.5 grams of 1-(3',4'-dimethyl-phenyl)-2-[3"-phenyl-3"-cyclohexenyl-propyl-(1")-amino]-propane hydrochloride melting at 179–181° C.

We claim:
1. A compound of the formula

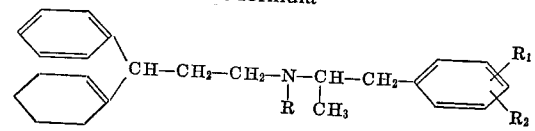

wherein R represents hydrogen or methyl, R$_1$ and R$_2$ represent hydrogen or alkyl groups having 4 carbon atoms at most, or the acid addition salts thereof.

2. 1 - phenyl - 2-(3'-phenyl-3'-cyclohexenyl - propyl-(1')-methyl-amino)-propane.

3. 1 - phenyl-2-(3' - phenyl - 3'-cyclohexenyl-propyl-(1')-amino)-propane.

4. 1 - (3',4'-dimethylphenyl) - 2 - [3"-phenyl-3"-cyclo-hexenyl-propyl-(1")-amino]-propane.

References Cited

UNITED STATES PATENTS 3,328,249    6/1967    Schodack et al. _____ 167—65

CHARLES B. PARKER, *Primary Examiner.*

ROBERT V. HINES, *Assistant Examiner.*